(12) United States Patent
Theune

(10) Patent No.: US 10,473,817 B2
(45) Date of Patent: Nov. 12, 2019

(54) PROCESSING DATA REPRESENTING A PHYSICAL SYSTEM

(75) Inventor: Ulrich Theune, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 1058 days.

(21) Appl. No.: 14/396,591

(22) PCT Filed: Apr. 24, 2012

(86) PCT No.: PCT/EP2012/057467
§ 371 (c)(1),
(2), (4) Date: Nov. 18, 2014

(87) PCT Pub. No.: WO2013/159810
PCT Pub. Date: Oct. 31, 2013

(65) Prior Publication Data
US 2015/0100241 A1    Apr. 9, 2015

(51) Int. Cl.
*G01V 99/00* (2009.01)
*G01V 1/30* (2006.01)
*G01V 1/28* (2006.01)

(52) U.S. Cl.
CPC .......... *G01V 99/005* (2013.01); *G01V 1/282* (2013.01); *G01V 1/308* (2013.01);
(Continued)

(58) Field of Classification Search
USPC .......................................................... 702/14
See application file for complete search history.

(56) References Cited

U.S. PATENT DOCUMENTS

| | | | |
|---|---|---|---|
| 7,636,275 B2 * | 12/2009 | Anno | G01V 1/308 367/21 |
| 8,095,345 B2 * | 1/2012 | Hoversten | G01V 11/00 702/181 |

(Continued)

FOREIGN PATENT DOCUMENTS

| | | |
|---|---|---|
| GB | 2 409 900 A | 7/2005 |
| GB | 2463242 A | 3/2010 |
| WO | WO 2010/090825 A2 | 8/2010 |

OTHER PUBLICATIONS

Dixit et al., "Time-Lapse Seismic*-Concept, Technology & Interpretation," Geohorizons, Jan. 2012, pp. 66-72.

(Continued)

*Primary Examiner* — Gregory J Toatley, Jr.
*Assistant Examiner* — Terence E Stifter, Jr.
(74) *Attorney, Agent, or Firm* — Birch, Stewart, Kolasch & Birch, LLP (57) ABSTRACT

A method is provided of processing data representing a physical system, the method comprising: providing (P2) input data representing differences in the physical system between a first state and a second state of the physical system; and inverting (P5) the input data, or data derived therefrom, in accordance with a parameterized model (PI) of the physical system to obtain differences in the parameters of the model between the first state and the second state, with parameters of the model representing properties of the physical system; wherein the inverting step is performed (P3 to P6) for a plurality of different perturbations (P4) of the parameterized model and/or of the data to obtain a plurality of sets of differences in the parameters of the model; and wherein a statistical analysis (P7) of the plurality of sets of differences is performed to obtain statistical characteristics of the differences in the parameters of the model.

28 Claims, 7 Drawing Sheets

(52) U.S. Cl.
CPC .. *G01V 2210/612* (2013.01); *G01V 2210/624* (2013.01); *G01V 2210/66* (2013.01)

(56) References Cited

U.S. PATENT DOCUMENTS

| | | | |
|---|---|---|---|
| 10,012,747 | B2 | 7/2018 | Wang et al. |
| 10,024,991 | B2 | 7/2018 | Keskes |
| 10,036,820 | B2 | 7/2018 | Can et al. |
| 2008/0189043 | A1 | 8/2008 | Anno et al. |
| 2008/0195358 | A1* | 8/2008 | El Ouair ............... G01V 1/30 703/2 |
| 2009/0271118 | A1* | 10/2009 | Saltzer ............... G01V 1/306 702/14 |
| 2010/0142323 | A1* | 6/2010 | Chu ............... G01V 11/00 367/73 |
| 2010/0270026 | A1* | 10/2010 | Lazaratos ............... G01V 1/28 166/369 |
| 2011/0222370 | A1* | 9/2011 | Downton ............... G01V 1/282 367/73 |

OTHER PUBLICATIONS

A. Buland et al., "Bayesian time-lapse inversion", Geophysics, vol. 71, No. 3, XP-001243674, pp. R43-R48, May 1, 2006.

M. Sambridge et al., "Monte Carlo Methods in Geophysical Inverse Problems", Reviews of Geophysics, vol. 40, No. 3, pp. 3-1-3-29, Jan. 1, 2002.

Mesdag et al., Jun. 5, 2003, Integrated AVO Reservoir Characterization and Time-Lapse Analysis of the Widuri Field, 65th Mtg., Eur., Assn Expl. Geophys., Extended Abstracts.

Sarkar et al., 2003, On the Inversion of time-lapse seismic data, 73rd Ann. Internat. Mtg.: Soc. of Expl. Geophys., 1489-1492.

\* cited by examiner

PROCESSING DATA REPRESENTING A PHYSICAL SYSTEM

The present invention relates to processing data representing a physical system. In particular, the present invention relates to a method of and apparatus for performing one or more inversions of data to derive properties or changes in properties of the physical system.

Seismic reflection data interpretation is a technique used to determine details of structures beneath the surface of the Earth. The resolution that may be achieved makes this technique the method of choice for oil exploration and mapping of subsurface rock structures. It is also applicable to experimental research that probes the fine structure within the Earth's crust and at the crust-mantle boundary.

The technique involves generating downward-propagating seismic waves in succession at a number of locations within the region being explored. A large number of receivers are positioned at intervals away from each source location and these receivers record the amplitudes (for example, in terms of pressure, displacement or its derivative) of seismic waves reflected back up to the surface from subsurface inhomogeneities over a period of time. The recorded waves are usually deconvolved, removing the effects of the source and receiver (which have their own response functions).

Reflection data typically have low amplitudes and are contaminated by multiple reflections and other kinds of noise. Various acquisition and processing techniques may be used to improve signal-to-noise ratios, such as averaging (stacking) of traces with the same midpoint, taking into account different distances between source and receiver, and discrimination of multiple reflections based on either their periodicity or wavefront angles which differ from the primary reflections. Further, the data may be correctly positioned in space by a process called migration, which moves dipping events into their correct position. When comparisons are made between two or more datasets over the same area, careful analysis between the amplitude, time and other attributes of the datasets may be made.

After the appropriate corrections, which may further include correction for other known environmental variables, the data are combined to provide a graphical representation of the subsurface inhomogeneities.

Seismic reflection data obtained by field experiments are then processed to obtain a three dimensional image of subsurface structures as described above. The three dimensions refer to the spatial dimensions "illuminated" by the seismic data. The vertical axis may represent depth or two-way vertical seismic wave travel time.

The amplitudes of reflected seismic waves are indicative of the subsurface reflection strengths, contaminated by noise. The reflection strength depends upon the reflection coefficient, which may be defined as a function of the relative contrasts of the elastic material properties of the subsurface layers.

The elastic properties of an isotropic, elastic medium are completely described by three parameters, for example the two elastic Lamé parameters and the density. Other parameterisations are possible, for example acoustic impedance, shear impedance and density. A third example is P-wave velocity, S-wave velocity, and density. The transformation between different sets of elastic parameters is well defined and straightforward.

In general, the elastic properties vary spatially. In order to explain the relationship between the elastic properties and the seismic data it may be convenient to imagine the subsurface as a stack of geological layers. The layer properties are described by the elastic properties of the rocks within the layers while the seismic data are related to the contrasts of the layer properties between successive layers. The seismic data are therefore suitable for interpreting subsurface layer structures since they image the boundaries between the layers.

Seismic inversion is defined herein as the process of transforming (inverting) seismic reflection data to elastic material properties, i.e. taking amplitudes (measurements of contrasts) and using them to infer physical layer properties. Numerous different seismic inversion techniques are known.

Over a period of time, certain types of rock, known as source rocks, will produce hydrocarbons. The produced hydrocarbons are then transferred to and stored in rocks known as reservoir rocks through various geological processes. During production of hydrocarbons in a subsurface region, the effective elastic material properties of the reservoir rocks change with production time, where production time is the fourth dimension in seismic 4D analysis. The changes of the effective elastic properties of the reservoir rocks may be caused by changes of the pore fluid saturations in the reservoir rocks, but also by pressure and temperature changes. Explained by a simple layer-based earth model concept, the properties of the reservoir layer are changed during production, implying changes in the reflectivity for the upper and lower reservoir interfaces. The measurements taken at a further seismic survey are related to the new contrasts at the boundaries between adjacent layers.

Reservoir changes are often inferred from a comparison of the seismic data (e.g. amplitudes of seismic waves reflected at interfaces bounding or within the reservoir) for different seismic surveys acquired at different stages of the production. A more direct interpretation can be based on difference data. Difference data are established by subtracting two time-separated seismic surveys covering a common part of the earth. The difference data, after the proper time-alignment during pre-processing, represent a spatial image of the changes of the relative contrasts between the two different acquisition times.

For a three dimensional seismic dataset, the classic inversion problem is to estimate the elastic material parameters from the three dimensional seismic data. A natural extension of 3D inversion to inversion of time-lapse seismic data (4D) is to invert the different 3D datasets separately by a known method, and then subtract the results to obtain the changes.

However, the reliability of 4D interpretations is difficult to assess, and are made by qualitative assessment. A full consideration of the uncertainties involved is important for making an accurate inference of the changes in the reservoir properties between the two seismic surveys. The results of such seismic analysis may be important in reservoir management in that the inferred reservoir properties are used to evaluate, for example, new drilling targets and future drainage strategies.

Seismic inversion provides quantitative estimates of the elastic reservoir properties. However, inversion of noisy seismic data is known to be a difficult and ill-posed procedure. An appropriate assessment of the uncertainties in 4D inversion data has not previously been possible or only to a limited extent.

Commercial time-lapse inversion techniques have become available, but only with brief descriptions of the methods. Some results have been published (Mesdag et al, 2003, Integrated AVO reservoir characterisation and time-lapse analysis of the Widuri field, $65^{th}$, Eur., Assn. Expl. Geophys., Extended Abstracts). Such methods apply separate inversions of the data with some constraint between the results, e.g. a common background model. The time-lapse change is then calculated from the change in inverted parameters. Sarkar et al, 2003, On the Inversion of time-lapse seismic data, 73$^{rd}$ Ann. Internat. Mtg.: Soc. Of Expl. Geophys., 1489-1492, mentions inversion of seismic differences, but provides no detail of the implementation. None of these inversion techniques provide uncertainty bounds on the results.

GB240990, incorporated herein by reference, describes a technique which permits improved inversion of seismic data representing a physical system in order to provide seismic property data. A method of data inversion is described that operates directly on seismic difference data, and in particular to the difference between two sets of measured data representing a system in first and second states. The inversion method can be used to estimate the changes of the elastic material properties of a region of the Earth containing a hydrocarbon reservoir due to production or removal of hydrocarbons. Such a technique may be used to handle errors intrinsic to such data and can provide, for example, probability distributions or uncertainty bounds on the results of inversion.

However, the present applicant has appreciated the desirability of providing an improved inversion technique which accounts for additional uncertainties in aspects of the input data and/or the modelling. The present applicant has also appreciated the desirability of extending such an inversion technique in order to provide data relating to petro-physical properties of the reservoir.

According to a first aspect of the present invention, there is provided a method of processing data representing a physical system, the method comprising: providing input data representing or relating to differences in the physical system between a first state and a second state of the physical system; and inverting the input data, or data derived therefrom, in accordance with a parameterised model of the physical system to obtain differences in the parameters of the model between the first state and the second state, with parameters of the model representing or relating to properties of the physical system; wherein the inverting step is performed for a plurality of different perturbations of the parameterised model and/or of the data to obtain a plurality of sets of differences in the parameters of the model; and wherein a statistical analysis of the plurality of sets of differences is performed to obtain statistical characteristics of the differences in the parameters of the model.

The properties may be physical properties.

The statistical characteristics may comprise a mean of the plurality of sets.

The statistical characteristics may comprise a standard deviation of the plurality of sets.

The pertubations of the parameterised model may be within a range based on an uncertainty associated with the model.

The first state may be a derived or calculated reference state. The second state may be a measured or observed state.

The pertubations of the data may be within a range based on an uncertainty associated with the data.

The parameterised model may be a second parameterised model and the input data may be second input data, with parameters of the second model representing or relating to second properties of the physical system. With this in mind, the method may further comprise deriving the second input data by inverting first input data in accordance with a first parameterised model of the physical system to obtain differences in the parameters of the first model between the first state and the second state, with parameters of the first model representing or relating to first properties of the physical system.

The first input data may comprise a difference between first and second seismic data representing or relating to the physical system in the first and second states, respectively.

The method may comprise forming the difference between the first and second seismic data.

The seismic data may be reflection data.

The first properties may be seismic properties.

The second properties may be physical properties.

The physical properties may be petrophysical properties. Petrophysical properties may considered to comprise at least one of lithology, porosity, saturation (e.g. oil, gas, water, brine), pore pressure, permeability, density, solid mechanics, magnetization, electrical conductivity, thermal conductivity and radioactivity.

According to a second aspect of the present invention, there is provided a method of processing seismic data representing a physical system, the method comprising: forming a difference between first and second seismic data representing or relating to the system in a first state and a second state, respectively; inverting the difference in accordance with a first parameterised model of the physical system to obtain differences in the parameters of the first model between the first state and the second state, with parameters of the first model representing or relating to seismic properties of the physical system; inverting the obtained differences in the parameters of the first model, or data representing or derived from the obtained differences, in accordance with a second parameterised model of the physical system to obtain differences in the parameters of the second model between the first state and the second state, with parameters of the second model representing or relating to physical properties of the physical system.

The seismic data may be reflection data.

The physical system may include a region containing a reservoir and the physical properties may be reservoir properties.

The reservoir may comprise a hydrocarbon reservoir.

The reservoir properties may comprise pore pressure and at least two of oil saturation, gas saturation and brine saturation.

One or both of the first and second seismic data may be measured seismic data.

The parameters of the first model may relate to any complete set of elastic properties that can be used to formulate a linear expression of reflectivity.

The parameters of the first model may relate to the P-wave velocity, the S-wave velocity, and the density.

The parameters of the first model may relate to the acoustic impedance, the shear impedance, and the density.

The first and second states may represent or relate to the physical system at different times.

The or each inversion may be an inversion of d=Ap+e, where d represents the data provided to the inversion, p represents the differences in the parameters of the model, A is a forward modelling operator for the model concerned, and e is an error term.

The pertubations of the model may relate to variations in the forward modelling operator A.

The pertubations of the data may relate to variations in the data d.

The or each inversion may be performed in a statistical environment.

The or each inversion may be a least squares inversion.

The or each inversion may be a Bayesian inversion.

A first part of the solution to the or each inversion may be a posterior expectation.

The posterior expectation may correspond to differences in the parameters of the model concerned.

A second part of the solution to the or each inversion may be a posterior covariance.

The posterior covariance may correspond to an uncertainty in the posterior expectation.

Differences in the parameters of the or each model may follow Gaussian statistics.

The prior knowledge about the differences of the parameters of the or each model may be defined in a prior model.

The obtained differences in the parameters of the model may be used to assess where changes in the physical system have occurred between the first and second states.

The obtained differences in the parameters of the model may be used to assess the change in hydrocarbon content in the hydrocarbon reservoir.

The obtained differences in the parameters of the model may be used to assess the probabilities of differences in the physical system between the first and second states.

The probabilities of differences in the physical system may be used to generate a probability density map of differences in the physical system.

An apparatus is also proposed for processing data representing a physical system, the apparatus comprising means (e.g. at least one component such as at least one processor or processing unit) for performing a method according to the first or second aspect of the present invention.

A program is also proposed for controlling an apparatus to perform a method as herein proposed, or which, when loaded into an apparatus, causes the apparatus to become an apparatus as herein proposed. The program may be carried on a carrier medium. The carrier medium may be a storage medium. The carrier medium may be a transmission medium. An apparatus programmed by such a program is also envisaged, as is a storage medium containing such a program.

Since the present invention is related closely to GB240990, the appended claims are intended to be interpreted in a manner consistent with GB240990.

Reference will now be made, by way of example, to the accompanying drawings in which:

FIGS. 5A and 5B illustrate results of a petro elastic inversion to static properties. FIG. 5A shows pressure data while FIG. 5B shows oil saturation data. Initial models (dotted), the true pressure values (thin solid line) and the petro-elastic inversion result (bold solid line) are included. The grey shaded area illustrates the uncertainty range of the petro-elastic inversion.

FIGS. 6A, 6B and 6C illustrate results of a petro elastic inversion to reservoir property changes. FIG. 6A shows the changes of effective pressure data, FIG. 6B changes of oil saturation, while FIG. 6C displays gas saturation changes. Initial models (dotted), the true pressure values (thin solid line) and the petro-elastic inversion result (bold solid line) are included. The grey shaded area illustrates the uncertainty range of the petro-elastic inversion.

As mentioned above, the present applicant has appreciated the desirability of improving upon the technique disclosed in GB240990 and extending it to provide data relating to physical properties of the reservoir.

In this respect, estimating reservoir properties (such as pore pressure and oil and gas saturation) from seismic data is important for optimizing reservoir production, and has accordingly been the subject of considerable research during the past two decades or so, with numerous studies published in the geophysical literature.

A brief overview will now be presented of a selection of those studies that are considered to be most closely related to an embodiment of the present invention. Most previous studies relate to the estimation of static reservoir properties (such as porosity, shale volume, initial water saturation or sand probability), with only a few publications relating to time-lapse applications.

One of the earlier studies on estimating reservoir properties from seismic data is the work by Carcione et al. (2003), who describe a method to estimate pore pressure from inverted seismic velocities, where a statistical model linking velocities to pore pressure has been used. In order to estimate the in-situ pore pressure, the model has been matched to the observations using the pore pressure as a matching variable. As such, this is a deterministic approach.

A different methodology has been used by Eidsvik et al. (2002, 2004) Bachrach et al. (2004) Larsen et al. (2006) (whose work has been later refined by Ulvmoen and Omre (2010) and Ulvmoen et al. (2010)), Bosch et al. (2007), Bosch et al. (2009) Buland et al. (2008) and most recently by Grana and Della Rossa (2010), who used a Bayesian formulation to infer reservoir properties from seismic data (e.g., porosity, initial water saturation, shale volume or sand probability).

The advantage of these Bayesian/statistical approaches is that this formulation also allows the assessment of the inversion uncertainties of the reservoir properties, which provides insight into how much confidence to place in the estimations. There can be considered to be two different classes of methods: some work aims at estimating continuous parameters (e.g., Bosch et al., 2007, 2009; Grana and Della Rossa, 2010) while other techniques deliver a discrete class of lithologies/fluid content (e.g., Eidsvik et al., 2002, 2004; Larsen et al., 2006).

Much less work on time-lapse petro-elastic inversion has been published to date. In this connection, a petro-elastic model can be considered to be one which relates reservoir (or physical) properties to elastic (or seismic) properties, with a petro-elastic inversion being performed to derive one such set of properties from the other using such a model. Brevik (1999) describes a concept of using changes in PP and PS travel-times for the estimation of saturation and pressure changes. Landrø (2001) describes a parameterisation of the velocity changes in terms of saturation and pressure changes, which is then used in an AVO model. This empirical model requires several simplifications and approximations, and an uncertainty estimation is not provided in this work. Landrø et al. (2003) extended the model to a joint PP-PS inversion problem. Their work has been later refined by Hafslund Veire et al. (2006) who utilized the statistical interference model in Eidsvik et al. (2004) to estimate changes in reservoir properties and associated changes.

A different approach was presented by El Ouair and Strønen (2006), who describe a method to deterministically estimate pore pressure and oil saturation changes from inverted seismic properties. The underlying model is based on an empirical fit between modelled seismic and reservoir property changes. Posterior uncertainties are subsequently assessed through Monte Carlo sampling.

A petro-elastic inversion method is proposed herein that converts changes or differences in seismic properties, for example obtained from the inversion technique disclosed in GB240990, into changes or differences in reservoir properties, including a treatment of the associated uncertainties. In this respect, seismic properties could for example be compressional or P wave velocity ($V_P$), shear or S wave velocity ($V_S$), and density ρ, or acoustic impedance ($I_P$), shear impedance ($I_S$) and density p, while reservoir properties could for example be pore pressure ($P_P$) and saturations of two phases $S_1$ and $S_2$; these two phases can be any combination of the three possible fluid components: gas, oil and brine. Such an inversion is based on a rock-physics model that describes the dependencies between seismic properties (e.g. velocities, impedances, density) and reservoir properties (e.g. pore pressure and oil saturation). This model forms the basis for a parameterisation of the seismic properties in terms of reservoir properties such as pore pressures and oil saturation.

Seismic and reservoir properties typically depend non-linearly on each other in a rock-physics model; however, such models can be linearized and approximated through an expansion in Taylor series, which leads to a linear forward/inversion problem. In principle, readily-available routines for linear inversions can be used to estimate changes in the dynamic reservoir properties from inverted changes in seismic properties.

However, unlike a typical seismic inversion problem, for example, the present applicant has appreciated that the parameterised operator linking reservoir properties to seismic properties has many parameters which are uncertain. As such, the present applicant has appreciated that a single application of such a petro-elastic inversion may be unreliable. In addition, when posed in a Bayesian setting, the estimated posterior uncertainties of the reservoir properties will not contain all the relevant uncertainties.

Therefore it is proposed herein to apply the petro-elastic inversion multiple times with relevant parameters perturbed (e.g. randomly) for each iteration, a technique sometimes called sampling or, as referred to herein, Monte Carlo Inversion (MCI). By storing each inversion result, an ensemble of possible reservoir properties is obtained that can be analysed statistically. In that way, a representative solution can be obtained (e.g. the mean of the ensemble) as well as its uncertainty (e.g. the ensemble's standard deviation). The estimated uncertainties are an important source of information for further use of the estimated reservoir properties for modelling or risk assessment in reservoir management decisions.

An approach according to an embodiment of the present invention can be considered to differ from the above-mentioned previous studies in several ways. The petro-elastic inversion model is based on an analytical rock physics model, enabling a thorough analytical tracking of the uncertainties related to the rock-physical petro-elastic model.

This approach provides a "physical insight" to the more often applied empirical parameter models and thereby improves the credibility of the rock-physical model.

However, the dependence of the seismic parameters on the reservoir parameters is generally non-linear in rock-physics models. In order to incorporate it into a linear inversion methodology, a Taylor series expansion is proposed, which will result in a joint linear inversion problem for the estimation of pore pressure an oil saturation changes from inverted changes in seismic properties.

The input data for the inversion can be inverted changes in seismic properties (e.g., seismic velocities and density) rather than seismic amplitude data themselves. This is beneficial because seismic inversion results can be considered to have a value for interpretation due to the typically higher resolution. In addition, such a petro-elastic inversion is applicable more flexibly as it is not tied to one particular seismic inversion package.

A linearized rock-physics model for petro-elastic inversion according to an embodiment of the present invention will now be described.

In the described embodiment, the aim is to convert inverted changes or differences in seismic properties (such as P-wave and S-wave velocities or impedances and density) to changes in reservoir properties (such as pore pressure and oil saturation). In order to perform this task, a mathematical/physical model is provided that relates the changes in the reservoir properties to changes in the seismic properties. The link between seismic and reservoir properties can be formally written as:

$$V_P = V_P(S_1, S_2, P_P)$$

$$V_S = V_S(S_1, S_2, P_P)$$

$$I_P = I_P(S_1, S_2, P_P),$$

$$I_S = I_S(S_1, S_2, P_P)$$

$$\rho = \rho(S_1, S_2, P_P) \qquad (1)$$

where the seismic properties are: $V_P$ (compressional velocity); $V_S$ (shearwave velocity); $I_P$ (acoustic impedance); $I_S$ (shear impedance); and p (density); while the reservoir properties are: two saturations $S_1$ and $S_2$; and $P_p$ (pore pressure). The two saturations $S_1$ and $S_2$ are any combination of the three possible saturations for oil ($S_o$), gas ($S_g$) and brine ($S_b$).

As mentioned previously, the relationship between seismic and reservoir properties is non-linear. To linearize the problem, it is proposed to expand the rock-physics model in a Taylor series for a small perturbation δζ, where ζ=$S_1$, $S_2$, $P_p$, around some initial guesses ζ*, where ζ=$V_P$, $V_S$, $I_P$, $I_S$, ρ, up to the linear term, and find:

$$V_P \approx V_P^* + \frac{\partial V_P}{\partial S_1}\delta S_1 + \frac{\partial V_P}{\partial S_2}\delta S_2 + \frac{\partial V_P}{\partial P_p}\delta P_p \qquad (2a)$$

$$V_S \approx V_S^* + \frac{\partial V_S}{\partial S_1}\delta S_1 + \frac{\partial V_S}{\partial S_2}\delta S_2 + \frac{\partial V_S}{\partial P_p}\delta P_p \qquad (2b)$$

$$I_P \approx I_P^* + \frac{\partial I_P}{\partial S_1}\delta S_1 + \frac{\partial I_P}{\partial S_2}\delta S_2 + \frac{\partial I_P}{\partial P_p}\delta P_p \qquad (2c)$$

$$I_S \approx I_S^* + \frac{\partial I_S}{\partial S_1}\delta S_1 + \frac{\partial I_S}{\partial S_2}\delta S_2 + \frac{\partial I_S}{\partial P_p}\delta P_p \qquad (2d)$$

-continued $$\rho \approx \rho^* + \frac{\partial \rho}{\partial S_1}\delta S_1 + \frac{\partial \rho}{\partial S_2}\delta S_2 + \frac{\partial \rho}{\partial P_p}\delta P_p. \quad (2e)$$

The seismic properties labelled with an asterisk ($\zeta^*$) are reference values around which one approximates the changes with respect to a small perturbation of the reservoir properties $\delta\zeta$, where $\zeta=S_1, S_2, P_p$, which one wishes to invert for.

To avoid notational clutter, abbreviations are introduced for the seismic properties $s=[V_P, V_S, \rho]^T$ and for the reservoir $r=[S_1, S_2, P_p]^T$. If M furthermore describes the rock-physical link between seismic and reservoir properties, equation (1) is symbolized by $s=M(r)$ and P summarizes the partial derivatives in equation (2), its compact form is $$s=s^*+P\delta r+\varepsilon, \quad (3)$$

where P is a parameterised linear inversion or forward modelling operator and $\varepsilon$ is an error term, which represents approximation errors in the Taylor approximation and other artefacts such as additive random noise on the seismic properties, which are not modelled by the term $s^*+P\delta r$. It is further assumed a reference state of the model properties $r^*$, which describes an initial and simplified assumption about the model properties. This initial assumption can be based on general knowledge of the physical system. This reference state $r^*$ is related to the initial seismic properties by $s^*=M(r^*)$.

An isotropic elastic medium may be fully described using a set of three properties. This is why the symbol s is defined above as $[V_P, V_S, \rho]^T$, because only three of the seismic properties mentioned in equation (1) are necessary, in this case the P-wave velocity ($V_P$), S-wave velocity ($V_S$), and density $\rho$. An alternative characterization could be used, for example taking the acoustic impedance ($I_P$), shear impedance ($I_S$), and density ($\rho$) as the characterization variables instead.

The model of the earth for the region under consideration can be considered to be defined by model parameters and characterised by model properties describing the reservoir properties. At any point within the region, the state of the reservoir may be fully described using a set of three such properties. For example, as described above, the model properties representing the reservoir properties can be pore pressure ($P_p$) and saturations of two phases $S_1$ and $S_2$; (with these two phases being any combination of the three possible fluid components: gas, oil and brine), i.e. the set of model properties is $\{S_1, S_2, P_p\}$. So, one characterization which may be used takes $\{S_g, S_o, P_p\}$ as the characterization variables. An alternative characterization which may be used which takes $\{S_b, S_g, P_p\}$ as the characterization variables instead.

The model of the physical system effectively relates an experimental observation s to an experimental reference state $s^*$ and a perturbation $\delta r$ of the physical system. The relationship between the perturbation of the model properties $\delta r$ and the experimental observations s is given by the approximation of the rock physics model, P. The true model properties r are a perturbation of the initial model, i.e. $r=r^*+\delta r$. When inverting equation (3), the aim is to determine the perturbation of the model properties $\delta r$ from the experimental observation s. The perturbation so determined, in conjunction with the initial model properties $r^*$, provide a model of the true model properties r.

In other words, the model properties are represented by the symbol r. The model is symbolized by M(r) or its linearized form $s^*+P\delta r$. The state of the physical system is characterized by r. Varying model properties can be considered as perturbation $\delta r$ of a reference state $r^*$, i.e. $r=r^*+\delta r$. Applying the reference state to the model results in the experimental reference state $s^*$, i.e. $s^*=M(r^*)$. An experimental observation results from applying the model properties $r=r^*+\delta r$ to the model, resulting in $s=M(r^*)+P\delta r=s^*+P\delta r$ (ignoring the error contribution). The goal of physical inversion is to determine the model property perturbation $\delta r$ from an experimental observation s. A reference state is a set of model properties that is either known (or just assumed to be known), or it can be defined in a simple way based on common knowledge or common sense.

Petro-elastic inversion according to an embodiment of the present invention will now be described.

Inversion of real noise contaminated data is best performed in a stochastic Bayesian setting. Seismic and reservoir properties are then described by stochastic probability distributions p(s) and p($\delta r$). The relationship between seismic and reservoir properties is described by a data likelihood term p(s|$\delta r$). The probability distribution of the reservoir properties after utilizing the data s, p($\delta r$|s), is formally determined by the data likelihood and the distribution p($\delta r$) as:

$$p(\delta r|s) \propto p(s|\delta r)p(\delta r) \quad (4)$$

An analytical solution to the optimization problem of equation (4) exists, if both the reservoir property distribution p($\delta r$) and the data likelihood p(s|$\delta r$) are normally distributed. In this case, the reservoir properties are statistically described by two properties, the expectation $\mu_{\delta r}$ and covariance matrix $\Sigma_{\delta r}$, i.e.:

$$p(\delta r) \propto \exp(-(\delta r-\mu_{\delta r})^T \Sigma_{\delta r}^{-1}(\delta r-\mu \delta r)) \quad (5)$$

Secondly, the data likelihood is defined by two properties $\mu_s$ and $\Sigma_s$, which are the prior expectation for the misfit between observed data and modelled data $P\delta r$ and the corresponding covariance matrix for this misfit. Then:

$$p(s|\delta r) \propto \exp(-(s-s^*-P\delta r)^T \Sigma_s^{-1}(s-s^*-P\delta r)) \quad (6)$$

To invert for the reservoir property changes $\delta r$, one first takes the differences between the observed data s and reference values $s^*$, $\Delta s=s-s^*$. The resulting linear model can then be solved using linear optimization methods (e.g. Menke, 1984; Tarantola, 1987), which leads to:

$$\delta \hat{r} = \mu_{\delta r} + \Sigma_{\delta r} P^T (P\Sigma_{\delta r} P^T + \Sigma_s)^{-1}(\Delta s - P\mu_{\delta r}) \quad (7)$$

Furthermore, given the statistical properties of the noise and the apriori assumption of the model, $\Sigma_s$ and $\Sigma_{\delta r}$, the uncertainty of the inversion result, $\Sigma_{\delta r|s}$, is given by:

$$\Sigma_{\delta r|s} = \Sigma_{\delta r} - \Sigma_{\delta r} P^T (P\Sigma_{\delta r} P^T + \Sigma_s)^{-1} P\Sigma_{\delta r} \quad (8)$$

Note, however, that $\Sigma_{\delta r|s}$ only includes uncertainties due to data noise and apriori assumptions.

An uncertainty assessment carried out according to an embodiment of the present invention will now be described.

A significant contribution to the overall uncertainty of the inversion results r of equation (7) stems from the rock physics models contained in the modelling operator P. These uncertainties are due to ambiguous parameters used in the model and general limitations of the model in representing the full physics. In order to include these uncertainties, it is proposed to proceed according to the workflow represented schematically in FIG. 1.

Figure 1:
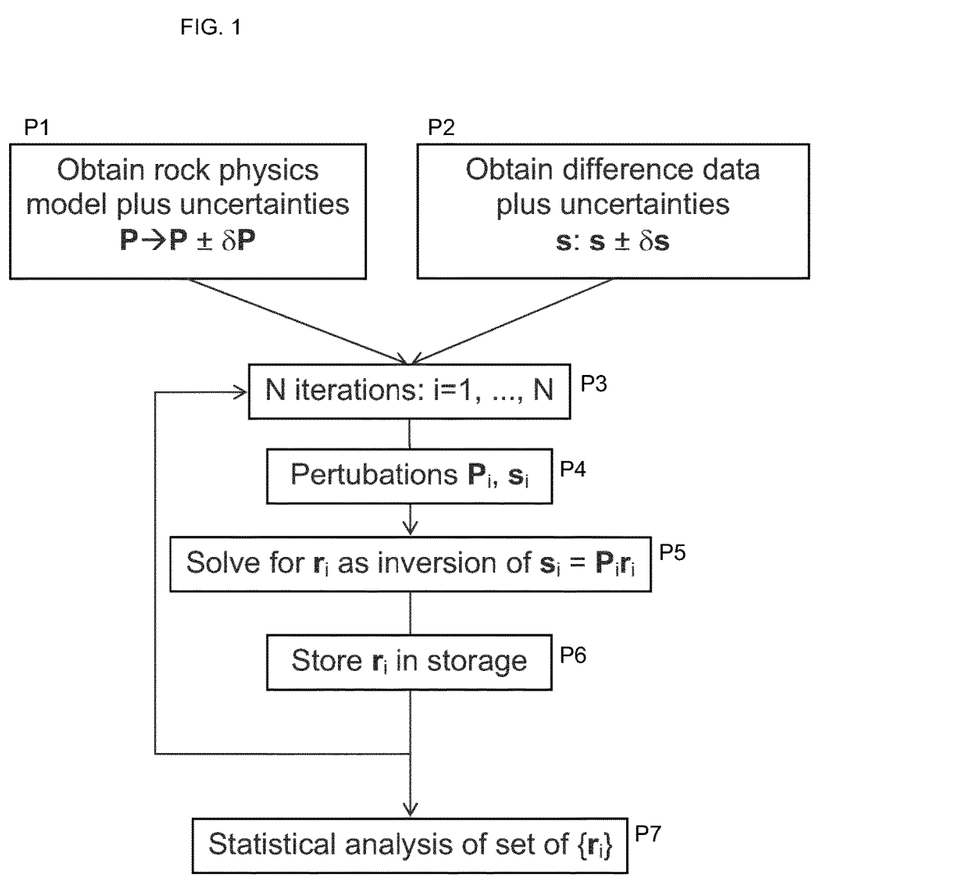
FIG. 1 is a schematic flow diagram illustrating a method according to an embodiment of a first aspect of the present invention.

In step P1 of FIG. 1, parameters of the approximated rock physics model P of the physical system and parameter variability are provided or assessed from data sources (e.g. in-situ measurements from well log data, rock core samples, generally accepted knowledge) and summarized as statistical properties (for example as a mean and standard deviation of a normal distribution).

In step P2, input data s are provided that represent differences in the physical system between a first state and a second state of the physical system. In this workflow, s is used as a shorthand for $\Delta s$ or $s-s*$. The nature of this input data in particular applications will be explained in more detail below, with reference to FIG. 2 and FIG. 3, but the data could e.g. be seismic property difference data obtained from a seismic inversion of seismic difference data); or the data could be drawn from a distribution (which, for example, is defined by mean values and covariance matrix); or the data can be any other type of data that represent differences in the physical system between a first state and a second state of the physical system. Statistical properties of the input data (for example a mean and standard deviation) are known or can be determined.

An iterative process is established in step P3, with a loop comprising steps P4, P5 and P6 being performed N times. The number N could be predetermined, or the number of iterations performed could be determined during performance of the method, e.g. it could be determined during the method when to exit from the iterative loop (i.e. to determine what N is).

In step P4, a realisation $P_i$ of modelling operator P is determined using perturbed parameters e.g. based on the statistical properties of P from step P1. Likewise, a realisation $s_i$ of input data s is determined using perturbed parameters e.g. based on the statistical properties of s from step P2. These are considered to be perturbations of the parameterised model P and of the data s. (It will appreciated that it is not essential that both P and s are perturbed for each iteration; indeed in another embodiment it may be that perturbations are only ever made to one or the other.)

In step P5, the inversion problem described above with reference to equation (7) is solved using $P_i$ and $s_i$ from step P4, to obtain solution $r_i$. In this workflow, r is used as a shorthand for $\delta r$ described with reference to equation (3) with the expression of equation (3) being represented in shorthand as $s_i = P_i r_i$.

Step P5 is therefore one of inverting the input data (or possibly data derived therefrom) in accordance with the parameterised model P of the physical system to obtain differences in the parameters of the model between the first state and the second state, with parameters of the model representing properties (such as reservoir properties) of the physical system.

In step P6, the result $r_i$ is stored in a data storage as part of an ensemble $\{r_i\}$.

By way of step P3 described above, the inverting step P5 is performed for a plurality N of different perturbations of the parameterised model P and/or of the data s to obtain a plurality of sets of differences in the parameters of the model, i.e. the ensemble $\{r_i\}$.

After the final iteration, in step P7 a statistical analysis of the ensemble $\{r_i\}$ is performed to obtain statistical characteristics of the ensemble. The mean $\mu$ of the ensemble would be a useful characteristic to determine, as a measure of the reservoir properties, as would the ensemble standard deviation a, as an uncertainty measure of the reservoir properties.

This workflow ensures that the final uncertainty assessment for the reservoir properties includes errors and ambiguities due to noise in the seismic properties, imperfections in the rock physics model and uncertainties of the prior model.

More specific applications embodying the present invention will now be described.

An embodiment of the present invention is applicable both to the determination of static reservoir properties from seismic properties of a single vintage, and to the determination of changes or differences in reservoir properties from time-lapse seismic properties. The underlying methodology is entirely equivalent, with the various terms in equations (2) and (7) merely being interpreted differently in the two applications. The statistical petro-elastic inversion workflow is entirely equivalent in both cases, and especially the definition of the modelling operator is the same for both applications. The differences are explained in the following description.

In a static inversion, the distribution of two fluid components and pore pressure is estimated from one set of seismic properties s. The reference model s* in this case results from applying the reference model r* to the rock physics model. The reference model r* is a three dimensional model for the initial distribution of two saturations and pore pressure. The initial pore pressure model can at least be based on the hydrostatic pressure gradient and the saturation can be estimated from one in-situ observations in boreholes. The perturbations $\delta r$ are the necessary correction values to update the initial model r* to match the observed seismic properties s, and $\Sigma_s$ is the deviation of the observed seismic properties from the initial model $M(r*)$.

Figure 2:
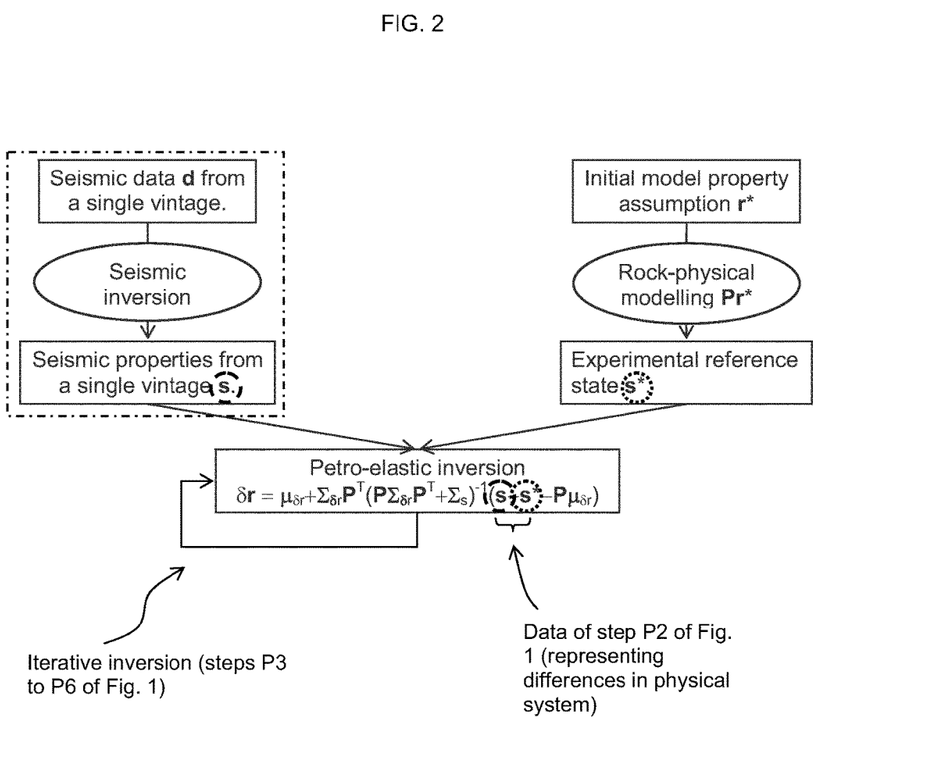
FIG. 2 is a schematic flow diagram illustrating the application of an embodiment of the first aspect of the present invention to static reservoir property estimation.

The aim with static estimation is to determine in-situ reservoir properties from seismic data from a single vintage. As illustrated in the example workflow for static estimation in FIG. 2, a reference model state r* is "guessed" from general knowledge and/or common sense. An experimental reference state is calculated by $s*=M(r*)$. Experimental observations s are based on a single vintage of seismic data. Estimation of model property perturbation $\delta r$ is via the inversion described by equation (7) above, i.e.:

$$\delta r = \mu_{\delta r} + \Sigma_{\delta r} P^T (P \Sigma_{\delta r} P^T + \Sigma_s)^{-1} (s - s* - P\mu_{\delta r}) \quad (9)$$

Relating this to the workflow of FIG. 1, in the static case the input data of step P2 of FIG. 1 (that representing differences in the physical system between a first state and a second state of the physical system) is $s-s*$. Here, s and s* are derived separately, the former in the left-hand branch of FIG. 2 and the latter in the right-hand branch. The first state corresponds to s* (a reference state) while the second state corresponds to s (derived via an inversion from seismic data from a single vintage).

For a dynamic reservoir property estimation, changes of reservoir properties are determined from seismic properties themselves determined from a base survey and a second set from a monitor survey, which has been acquired after some time. For this time-lapse case, the reference state s* are the seismic properties from the base case and the perturbations $\delta r$ are the time-lapse changes of the reservoir properties between the base and monitor surveys, while $\Sigma_s$ represents the time-lapse difference of the seismic properties between the base and monitor survey.

Figure 3:
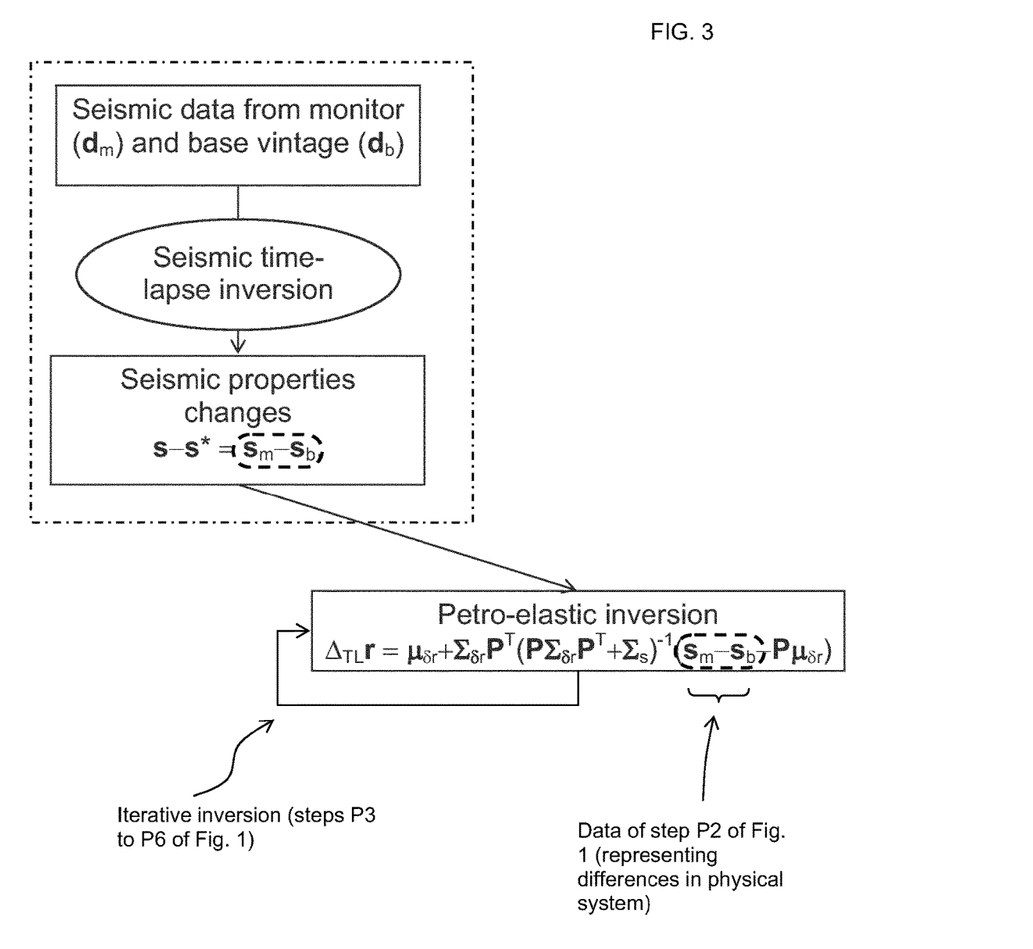
FIG. 3 is a schematic flow diagram illustrating the application of an embodiment of the first aspect of the present invention to dynamic reservoir property estimation.

The aim with dynamic estimation is to determine time-lapse changes in model properties, $\Delta_{TL} r$. As illustrated in the example workflow for dynamic estimation in FIG. 3, a reference model state r* is the (possibly unknown) state at the time of the base vintage. Perturbations $\delta r$ are actually the time-lapse changes $\Delta_{TL} r$. An experimental reference state s* are the seismic properties from the base vintage, $s_b$. Experimental observations s are seismic properties from monitor vintage, $s_m$:

$$\Delta_{TL} r = \mu_{\delta r} + \Sigma_{\delta r} P^T (P \Sigma_{\delta r} P^T + \Sigma_s)^{-1} (s_m - s_b - P\mu_{\delta r}) \quad (10)$$

Relating this to the workflow of FIG. 1, in the dynamic case the input data of step P2 of FIG. 1 (that representing differences in the physical system between a first state and a second state of the physical system) is $s_m-s_b$. Here, $s_m-s_b$ is a natural result of performing a seismic time-lapse inversion of seismic difference data d ($d_m-d_b$), for example as described in GB240990. The first state corresponds to $s_b$ (base vintage) while the second state corresponds to $s_m$ (monitor vintage).

In summary, the stochastic petro-elastic inversion workflow can be applied for static and dynamic model property estimation. In the static application, an initial (or reference) state for the reference model properties r* and experimental reference state s* are calculated. For the dynamic case, no initial assumptions for r* (and s*) need to be made as the experimental reference state is included in the simultaneous seismic inversions and the required difference s-s* (or $s_m-s_b$) for the model property estimation is a natural outcome of the seismic inversion.

Looking at the overall method, in both the static case (FIG. 2) and the dynamic case (FIG. 3), a two-stage inversion process is followed. A first inversion is from seismic data to seismic properties, and a second inversion is from seismic properties to reservoir properties.

Figure 4:
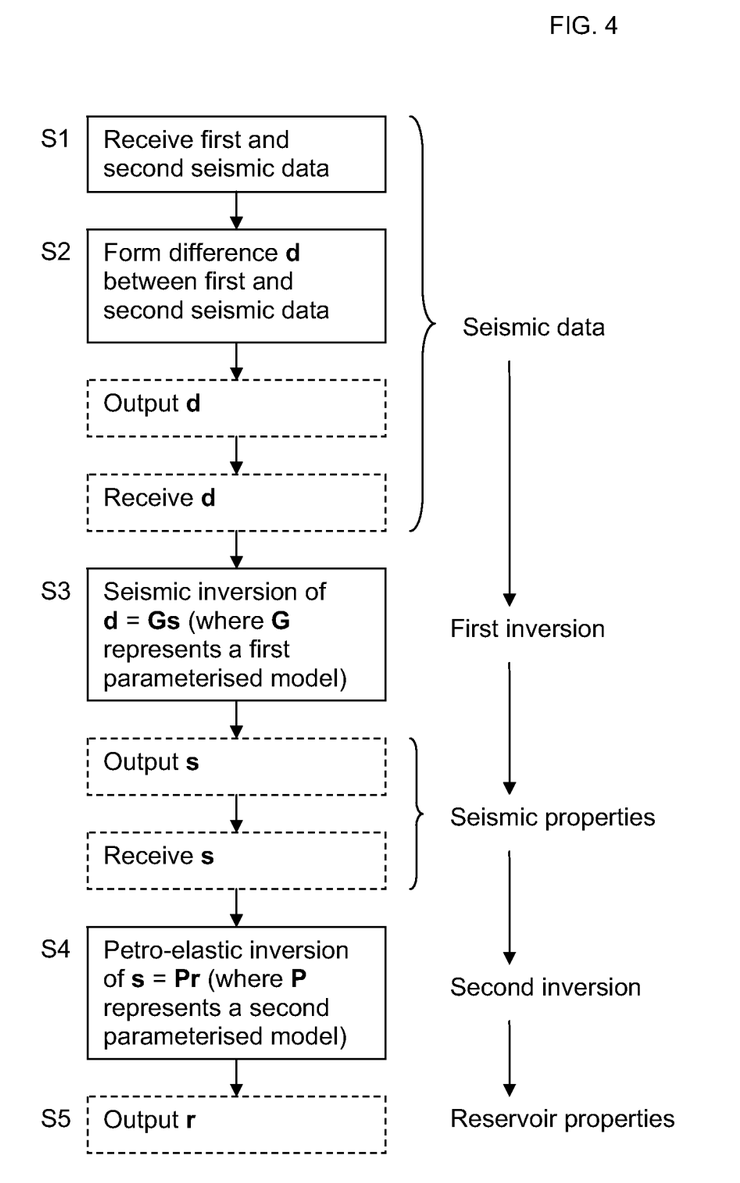
FIG. 4 is a schematic flow diagram illustrating a method according to an embodiment of a second aspect of the present invention.

Focussing on the dynamic case for the sake of brevity and not by way of limitation, the overall workflow is illustrated in FIG. 4. First and second measured seismic data are received in step S1 of the workflow, the first and second seismic data representing the system in a first state and a second state, respectively.

In step S2 a difference d is formed between the first and second seismic data.

A first (seismic) inversion is performed in step S3, in which the difference d is inverted in accordance with a first parameterised model G of the physical system to obtain differences s in the parameters of the first model between the first state and the second state, with parameters of the first model representing seismic properties of the physical system. This first (seismic) inversion step can be carried out according to the description in GB240990. There may be intermediate steps between S2 and S3 of outputting the obtained difference d for receipt (e.g. at another location either in the same data processing system or at another location entirely) to perform the first inversion.

A second (petro-elastic) inversion is performed in step S4, acting on the results of the first inversion step (or data derived therefrom). There may be intermediate steps between S3 and S4 of outputting the obtained differences s in the parameters of the first model (representing seismic properties) s for receipt (e.g. at another location either in the same data processing system or at another location entirely) to perform the second inversion. In the second inversion, the obtained differences s in the parameters of the first model (or data representing or derived from the obtained differences s) are inverted in accordance with a second parameterised model P of the physical system to obtain differences r in the parameters of the second model between the first state and the second state, with parameters of the second model representing physical properties (e.g. reservoir properties) of the physical system.

The second (petro-elastic) inversion step is that which is described above with reference for example to equation (10). At least the second inversion may be carried out in an iterative manner as described above with reference to FIG. 1.

The iterative nature of the inversion as shown in FIG. 1 (whether it be part of the first inversion stage or the second inversion stage or an inversion completely unrelated to this particular technical application) can be considered as a key feature of a first aspect of the present invention. A two stage-inversion is optional in the first aspect, because the iterative technique only requires a single inversion.

The two-stage inversion methodology represented in FIG. 4 is considered of itself to be new, regardless of whether either or both of the inversion stages are carried out iteratively. A two-stage inversion can be considered (of itself) as a key feature of a second aspect of the present invention. An iterative inversion (in either stage) is optional in the second aspect.

Of course, a combination of the first and second aspects is possible, such that an iterative inversion of the first aspect is performed in one or both of the inversions of the second aspect.

It is also noted that an embodiment of the first aspect is not limited to petro-elastic inversion (e.g. it could be applied to seismic inversion), and likewise an embodiment of the second aspect is not limited to seismic inversion followed by petro-elastic inversion.

An example of a static petro-elastic inversion will now be described.

Figure 5A:
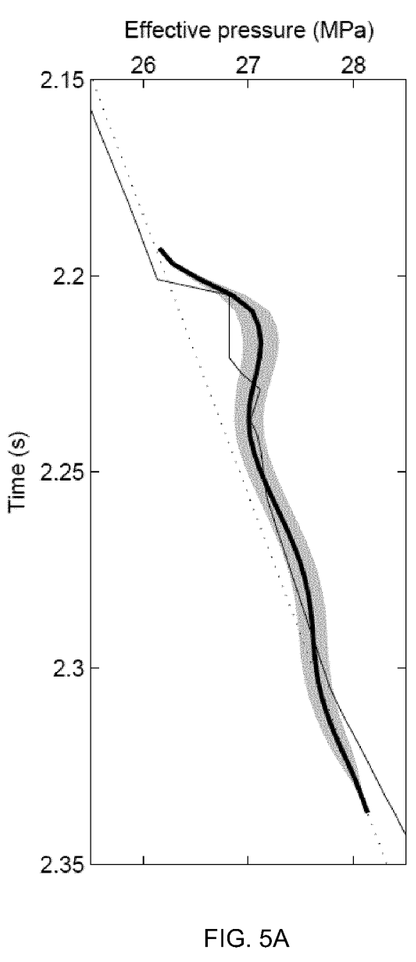
Figure 5B:
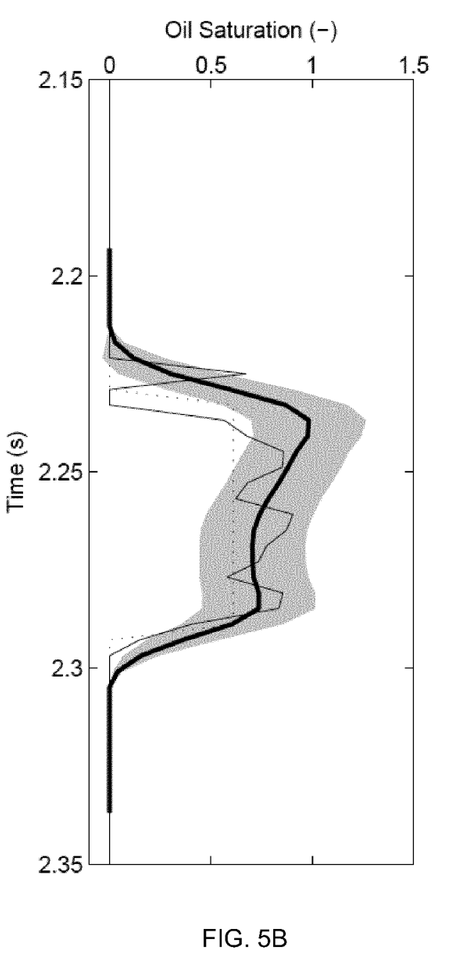

The functionality of the method is demonstrated with the help of synthetic data. The first example demonstrates the static application. Measured well log data are used to create synthetic seismic data, which are subsequently inverted (first step) to compressional P-wave velocities $V_p$, shear wave velocities $V_S$ and densities ρ, which form the seismic properties s for the petro-elastic inversion (second step). Then, initial models r* are formed for the pressure $P_p$ and the oil saturation $S_o$. These models are shown as dotted lines in FIG. 5 along with the true well log measurements (thin line). A suitable rock physics model was set up for the area of interest and the stochastic petro-elastic inversion work-flow described above was applied. The petro-elastic inversion results are included in FIG. 5 as bold lines. The gray shaded area displays the uncertainty range of +/− one standard deviation for the inversion results.

Because the petro-elastic inversion is applied to seismic properties, the estimated reservoir properties inherit the smoothness of the inversion results and do therefore not exhibit the same amount of details as the log measurements do. The inverted reservoir properties improve the initial guesses and therefore add values to reservoir management. The petro-elastic inversion results do not agree absolutely with the true values but as the uncertainty range indicates, these results agree for the dominant part within one standard deviation with the true values.

An example of a dynamic petro-elastic inversion will now be described.

Figure 6A:
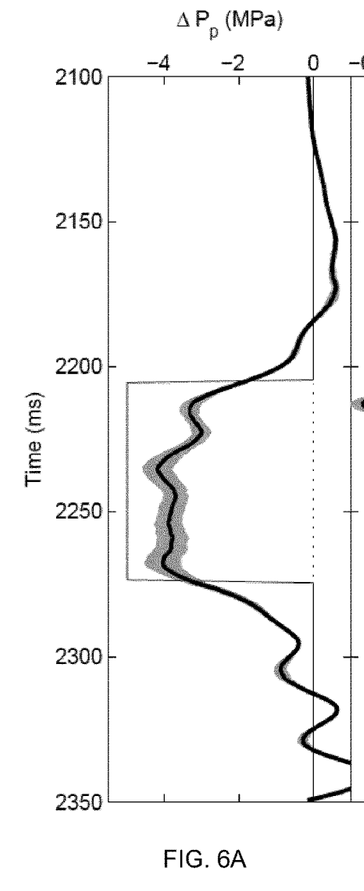
Figure 6B:
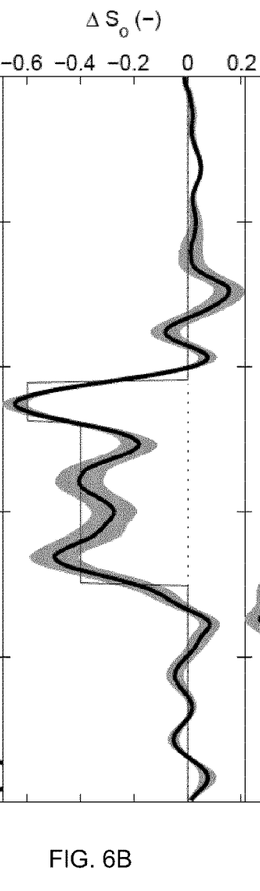
Figure 6C:
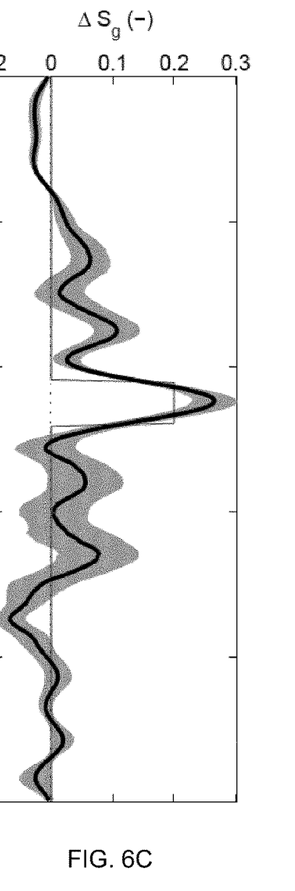

The well log data were perturbed to model production effects. The perturbations are illustrated as thin solid lines in FIG. 6: the pore pressure was reduced by 5 MPa, oil saturation decreased by 0.6 volume fraction in the upper part of the reservoir and by 0.4 volume fraction in the lower part of the reservoir. An increase of gas by 0.2 volume fraction has been modelled in the upper part of the reservoir (see thin solid lines in FIG. 6). Synthetic seismic data were then modelled for the pre and post production scenarios and subsequently inverted using the seismic Bayesian time lapse inversion method disclosed in GB240990. These inverted changes of seismic properties form the input data for the dynamic petro-elastic inversion. The initial reservoir property model 14, was set to zero for all changes of reservoir properties (i.e., pore pressure, oil and gas saturation), assuming apriori that there are not changes. This initial model is plotted in FIG. 6 as dotted lines. Thick lines display the dynamic petro-elastic inversion results for the pore pressure (left panel), oil saturation (middle panel) and gas saturation (right panel). The petro-elastic inversion results improve the initial guesses significantly, although they do not fully agree with the true values (thin lines in FIG. 6). In particular, the inversion results exhibit undulations, which are inherited from the seismic inversion results and are related to seismic inversion artefacts such as side-lobes. The uncertainty range of +/− one standard deviation indicates that the inverted saturation changes agree mostly with the expected values, while the inverted pore pressure change slightly underestimates the true change.

By way of summary, a stochastic petro-elastic inversion method with thorough uncertainty estimation has been described herein and demonstrated for synthetic examples. The inversion workflow is based on analytical rock-physics models which form a linear relationship between the input data (seismic properties) and desired reservoir properties after a Taylor series expansion of the rock physics model. Then, standard Bayesian inversion methods can be applied to update initial guesses of reservoir properties.

Different from standard inversion approaches is the perturbation of the modelling/inversion operator P in order to include uncertainties of the rock physics model. The uncertainties of the rock physics model/modelling operator are a significant contribution to the overall uncertainties of the inversion results and cannot be neglected as it is the case in standard inversion methods. The workflow presented here employs a Monte Carlo inversion approach to capture uncertainties in the rock physics model and incorporate them into the posterior inversion uncertainties.

The methodology can be applied for static and dynamic petro-elastic inversions. In the first (static) case, absolute values of reservoir properties are determined from inverted seismic properties (a combination of compressional and shear velocities or impedances and density) and an initial model. The initial models are typically simple models of the seismic properties and reflect general expectations of the in-situ state of pressure (for example, the pore pressure follows a hydrostatic trend) and oil saturations (which can be estimated from a few boreholes). For the dynamic case, changes in the reservoir properties are determined from inverted seismic property changes, where these changes are relative to the initial reservoir property state. The absolute value of the initial state does not necessarily have to be known. For the dynamic petro-elastic inversion to work, it is sufficient to assume apriori that no changes in the reservoir properties are present.

The data inversion methods described above may be embodied in a program for controlling a computer to perform the inversion. The program may be stored on a computer-readable storage medium, for example hard or floppy discs, CD or DVD-recordable media or flash memory storage products. The program may also be embodied in a signal such as a downloadable data signal transmitted across a computer network, for example the Internet or a group of computers connected together in a LAN. Any appended claims now or in future are to be interpreted as covering a computer program by itself, or as a record on a carrier, or as a signal, or in any other form.

Figure 7:
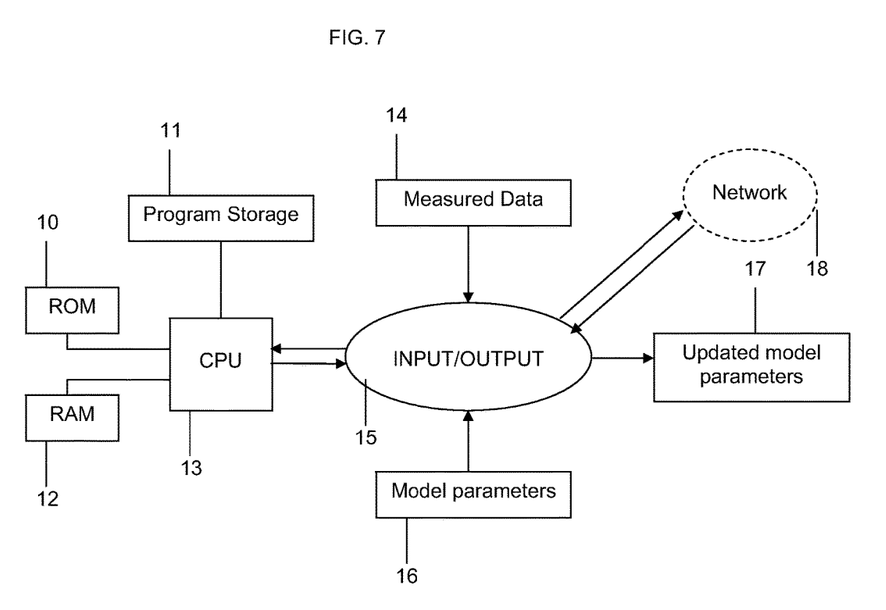
FIG. 7 is a block schematic diagram of an apparatus for performing a method embodying the present invention.

The schematic diagram of FIG. 7 illustrates a central processing unit (CPU) 13 connected to a read-only memory (ROM) 10 and a random access memory (RAM) 12. The CPU is provided with measured data 14 and model parameters 16 via an input/output mechanism 15. The CPU then performs the inversion(s) on the provided data in accordance with program steps or instructions provided by the program storage 11 (which may be a part of the ROM 10) and provides the output, i.e. the updated model parameters and uncertainties 17, via the input/output mechanism 15. The program itself, or any of the inputs and/or outputs to the system may be provided or transmitted to/from a communications network 18, which may be, for example, the Internet.

The appended schematic workflow diagrams can be considered not only to depict a series of method steps, but also to depict apparatus for performing those method steps. In this respect, a functional block depicted in a workflow diagram can be considered to represent a component such as a processor or processing unit which is adapted to or at least operable to perform the depicted function. Operation of one or more of these components can be controlled or provided at least in part by a program operating on the device or apparatus. The function of several depicted components may in fact be performed by a single component, such as the CPU 13, under control of the program. One or more of the components may be provided as dedicated hardware.

It will be appreciated by the person of skill in the art that various modifications may be made to the above described embodiments without departing from the scope of the present invention.

REFERENCES

Bachrach, R., M. Beller, C. Liu, J. Perdomo, D. Shelander, N. Dutta, and M. Benabentos (2004). Combining rock physics analysis, full waveform prestack inversion and high-resolution seismic interpretation to map lithology units in deep water: a Gulf of Mexico case study. The Leading Edge 23(4), 378-383.

Bosch, M., L. Cara, J. Rodrigues, A. Navarro, and M. Díaz (2007). A Monte Carlo approach to the joint estimation of reservoir and elastic parameters from seismic amplitudes. Geophysics 72(6), 029-039.

Bosch, M., C. Carvajal, J. Rodrigues, A. Tones, M. Aldana, and J. Siena (2009). Petrophysical seismic inversion conditioned to well-log data: Methods and application to a gas reservoir. Geophysics 74(2), 01-015.

Brevik, I. (1999). Rock model based inversion of saturation and pressure changes from time lapse seismic data. SEG expanded abstracts.

Buland, A., O. Kolbjørnsen, R. Hauge, ø. Skjæveland, and K. Duffaut (2008). Bayesian lithology and fluid prediction from seismic prestack data. Geophysics 73(3), C13-C21.

Carcione, J., H. Helle, N. Pham, and T. Toverud (2003). Pore pressure estimation in reservoir rocks from seismic reflection data. Geophysics 68(5), 1569-1579.

Eidsvik, J., P. Avseth, H. Omre, T. Mukerji, and G. Mavko (2004). Stochastic reservoir characterization using prestack seismic data. Geophysics 6(4), 978-993.

Eidsvik, J., H. Omre, T. Mukerji, G. Mavko, and P. Avseth (2002). Seismic reservoir prediction using Bayesian integration of rock physics and markov random fields: a North Sea example. The Leading Edge 21(3), 290-294.

El Ouair, Y. and K. Strønen (2006). Value creation from 4D seismic at the Gullfaks field: achievements and new challenges. In Soc. of Exploration Geophysicists (SEG) (Ed.), 76th annual international meeting, Expanded Abstracts.

Grana, D. and E. Della Rossa (2010). Probabilistic petro-physical-properties estimation integrating statistical rock physics with seismic inversion. Geophysics 75(3), 021-073.

Hafslund Veire, H., H. Borgos, and M. Landrø (2006). Stochastic inversion of pore pressure and saturation changes from time-lapse AVO data. Geophysics 71(5), C81-C92.

Landrø, M. (2001). Discrimination between pressure and fluid saturation changes from time-lapse seismic data. Geophysics 66(3), 836-844.

Landrø, M., H. Hafslund-Veire, K. Duffaut, and N. Najjar (2003). Discrimination between pressure and fluid saturation changes from marine multicomponent time-lapse seismic data. Geophysics 68(5), 1592-1599.

Larsen, A. L., M. Ulvmoen, H. Omre, and A. Buland (2006). Bayesian lithology/fluid prediction and simulation on the basis of a markov-chain prior model. Geophysics 71(5), R69-R78.

Menke, W. (1984). Geophysical Data Analysis: Discrete Inverse Theory, Volume 45 of International Geophysics Series. Academic Press.

Tarantola, A. (1987). Inverse problem theory: Methods for data fitting and model parameter estimation. Elsevier.

Ulvmoen, M. and H. Omre (2010). Improved resolution in Bayesian lithology/fluid inversion from prestack seismic data and well observations: Part I—Methodology. Geophysics 75(2), R21-R35.

Ulvmoen, M., H. Omre, and A. Buland (2010). Improved resolution in Bayesian lithology/fluid inversion from prestack seismic data and well observations: Part II—Real case study. Geophysics 75(2), B73-B82.

The invention claimed is:

1. A method of managing a hydrocarbon reservoir in order to optimize the production of hydrocarbons therefrom, the method comprising the steps of:
providing input seismic reflection data representing differences in a geological structure of the reservoir between a first state and a second state of the geological structure, wherein one of the states may be a synthetic reference state;
inverting the input seismic reflection data to obtain characteristic seismic attributes for the geological structure;
inverting the input seismic attributes, or data derived therefrom, in accordance with a parameterised model of the geological structure to obtain differences in the parameters of the model between the first state and the second state, with parameters of the model representing reservoir properties of the geological structure, wherein the inversion is an inversion of $d=Ap+e$, where d represents the input seismic attributes, p represents the differences in the parameters of the model, A is a forward modelling operator for the model concerned, and e is an error term; and
performing the inverting step for a plurality of different perturbations of the parameterised model and of the input seismic attributes to obtain a plurality of sets of differences in the parameters of the model, wherein the pertubations of the model are variations in the forward modelling operator A;
performing a statistical analysis of the plurality of sets of differences to obtain statistical characteristics of the differences in the parameters of the model; and
using said statistical characteristics to make drilling and drainage decisions regarding the reservoir.

2. The method as claimed in claim 1, wherein the statistical characteristics comprise a mean of the plurality of sets.

3. The method as claimed in claim 1, wherein the statistical characteristics comprise a standard deviation of the plurality of sets.

4. The method as claimed in claim 1, wherein the pertubations of the parameterised model are within a range based on an uncertainty associated with the model.

5. The method as claimed in claim 1, wherein the pertubations of the seismic reflection data are within a range based on an uncertainty associated with the seismic reflection data.

6. The method as claimed in claim 1, wherein the reservoir properties are physical properties.

7. The method as claimed in claim 1, wherein the parameters of the model comprise pore pressure and at least two of oil saturation, gas saturation and brine saturation.

8. The method as claimed in claim 1, wherein the input seismic attributes are any complete set of elastic properties that can be used to formulate a linear expression of reflectivity.

9. The method as claimed in claim 8, wherein the input seismic attributes are the P-wave velocity, the S-wave velocity, and the density.

10. The method as claimed in claim 8, wherein the input seismic attributes are the acoustic impedance, the shear impedance, and the density.

11. The method as claimed in claim 1, wherein the first and second states represent the geological structure at different times.

12. The method as claimed in claim 1, wherein each inversion is performed in a statistical environment.

13. The method as claimed in claim 12, wherein each inversion is a least squares inversion.

14. The method as claimed in claim 12, wherein each inversion is a Bayesian inversion.

15. The method as claimed in claim 13, wherein a first part of the solution to the or each inversion is a posterior expectation.

16. The method as claimed in claim 15, wherein the posterior expectation corresponds to differences in the parameters of the model concerned.

17. A method as claimed in claim 13, wherein a second part of the solution to the or each inversion is a posterior covariance.

18. The method as claimed in claim 1, wherein each inversion is one selected from the group consisting of, a least squares inversion and a Bayesian inversion, a first part of the solution to the or each inversion is a posterior expectation, a second part of the solution to the or each inversion is a posterior covariance, wherein the posterior covariance corresponds to an uncertainty in the posterior expectation.

19. The method as claimed in claim 1, wherein differences in the parameters of each model follow Gaussian statistics.

20. The method as claimed in claim 1, wherein prior knowledge about the differences of the parameters of each model is defined in a prior model.

21. The method as claimed in claim 1, wherein the obtained differences in the parameters of the model are used to assess where changes in the geological structure have occurred between the first and second states.

22. The method as claimed in claim 1, wherein the obtained differences in the parameters of the model are used to assess where changes in the geological structure have occurred between the first and second states wherein the obtained differences in the parameters of the model are used to assess the change in hydrocarbon content in the hydrocarbon reservoir.

23. The method as claimed in claim 1, wherein the obtained differences in the parameters of the model are used to assess the probabilities of differences in the geological structure between the first and second states.

24. The method as claimed in claim 23, wherein the probabilities of differences in the geological structure are used to generate a probability density map of differences in the geological structure.

25. The method of claim 1, further comprising:
providing a program embodied on a non-transitory computer readable medium and including computer program code configured to control a computer to perform the method; and
transmitting the program across a communications network.

26. A program embodied on a non-transitory computer readable medium and including computer program code configured to control a computer to perform a method comprising the steps of:
receiving input seismic reflection data representing differences in a geological structure of the reservoir between a first state and a second state of the geological structure, wherein one of the states may be a synthetic reference state;
inverting the input seismic reflection data to obtain characteristic seismic attributes for the geological structure;
inverting the input seismic attributes, or data derived therefrom, in accordance with a parameterised model of the geological structure to obtain differences in the parameters of the model between the first state and the second state, with parameters of the model representing reservoir properties of the geological structure, wherein the inversion is an inversion of $d=Ap+e$, where d represents the input seismic, attributes, p represents the differences in the parameters of the model A is a forward modelling operator for the model concerned, and e is an error term;
performing the inverting step for a plurality of different perturbations of the parameterised model and of the input seismic attributes to obtain a plurality of sets of differences in the parameters of the model, wherein the pertubations of the model are variations in the forward modelling operator A; and
performing a statistical analysis of the plurality of sets of differences to obtain statistical characteristics of the differences in the parameters of the model, wherein said statistical characteristics are for making drilling and drainage decisions regarding the reservoir.

27. A computer programmed to perform a method comprising the steps of:
receiving input seismic reflection data representing differences in a geological structure of the reservoir between a first state and a second state of the geological structure, wherein one of the states may be a synthetic reference state;
inverting the input seismic reflection data to obtain characteristic seismic attributes for the geological structure;
inverting the input seismic attributes, or data derived therefrom, in accordance with a parameterised model of the geological structure to obtain differences in the parameters of the model between the first state and the second state, with parameters of the model representing reservoir properties of the geological structure, wherein the inversion is an inversion of $d=Ap+e$, where d represents the input seismic attributes, p represents the differences in the parameters of the model, A is a forward modelling operator for the model concerned, and e is an error term;
performing the inverting step for a plurality of different perturbations of the parameterised model and of the input seismic attributes to obtain a plurality of sets of differences in the parameters of the model, wherein the pertubations of the model are variations in the forward modelling operator A; and
performing a statistical analysis of the plurality of sets of differences to obtain statistical characteristics of the differences in the parameters of the model, wherein said statistical characteristics are for making drilling and drainage decisions regarding the reservoir.

28. An apparatus for processing seismic reflection data representing a geological structure, the apparatus being configured to perform a method comprising the steps of:
receiving input seismic reflection data representing differences in a geological structure of the reservoir between a first state and a second state of the geological structure, wherein one of the states may be a synthetic reference state;
inverting the input seismic reflection data to obtain characteristic seismic attributes for the geological structure;
inverting the input seismic attributes, or data derived therefrom, in accordance with a parameterised model of the geological structure to obtain differences in the parameters of the model between the first state and the second state, with parameters of the model representing reservoir properties of the geological structure, wherein the inversion is an inversion of $d=Ap+e$, where d represents the input seismic attributes, p represents the differences in the parameters of the model A is a forward modelling operator for the model concerned, and e is an error term;
performing the inverting step for a plurality of different perturbations of the parameterised model and of the input seismic attributes to obtain a plurality of sets of differences in the parameters of the model, wherein the pertubations of the model are variations in the forward modelling operator A; and
performing a statistical analysis of the plurality of sets of differences to obtain statistical characteristics of the differences in the parameters of the model, wherein said statistical characteristics are for making drilling and drainage decisions regarding the reservoir.

* * * * *